US012754421B2

(12) United States Patent
Yoo et al.

(10) Patent No.: US 12,754,421 B2
(45) Date of Patent: Oct. 6, 2026

(54) ELECTRONIC DEVICE AND METHOD FOR TRANSMITTING INFORMATION RELATED TO A PROTECTION AREA IN WEARABLE ELECTRONIC DEVICE

(71) Applicant: SAMSUNG ELECTRONICS CO., LTD., Suwon-si (KR)

(72) Inventors: Junsang Yoo, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/912,168

(22) Filed: Oct. 10, 2024

(65) Prior Publication Data

US 2025/0116863 A1 Apr. 10, 2025

Related U.S. Application Data

(63) Continuation of application No. PCT/KR2024/015282, filed on Oct. 8, 2024.

(30) Foreign Application Priority Data

Oct. 10, 2023 (KR) ........................ 10-2023-0134194
Nov. 27, 2023 (KR) ........................ 10-2023-0166914

(51) Int. Cl.
*G02B 27/01* (2006.01)
*G06T 17/00* (2006.01)

(52) U.S. Cl.
CPC ............ *G02B 27/017* (2013.01); *G06T 17/00* (2013.01)

(58) Field of Classification Search
CPC ........................ G02B 27/017; G02B 27/0141
See application file for complete search history.

(56) References Cited

U.S. PATENT DOCUMENTS 10,901,215 B1 * 1/2021 Newcombe ........ G02B 27/0172
2017/0292848 A1 10/2017 Nepomuceno et al.
(Continued)

FOREIGN PATENT DOCUMENTS

JP 2019-8751 A 1/2019
JP 6770178 B2 10/2020
(Continued)

OTHER PUBLICATIONS

International Search Report (PCT/ISA/210) and Written Opinion (PCT/ISA/237) issued on Jan. 6, 2025 by the International Searching Authority in International Patent Application No. PCT/KR2024/015282.

*Primary Examiner* — William Boddie
*Assistant Examiner* — Andrew B Schnirel
(74) *Attorney, Agent, or Firm* — Sughrue Mion, PLLC

(57) ABSTRACT

A head mounted display (HMD) device is provided. The HMD includes: a communication interface; a processor; and memory storing instructions, which, when executed by the processor, cause the HMD device to: execute a first application related to virtual reality, identify a protection area of the HMD device corresponding to the first application, the protection area of the HMD device being set based on a position of the HMD device, and transmit information related to a change in the protection area of the HMD device through the communication interface, based on the protection area of the HMD device changing.

18 Claims, 14 Drawing Sheets

(56) References Cited

U.S. PATENT DOCUMENTS

| | | | | |
|---|---|---|---|---|
| 2019/0033989 | A1* | 1/2019 | Wang | G06F 3/0346 |
| 2019/0089817 | A1 | 3/2019 | Gulbay | |
| 2019/0340909 | A1 | 11/2019 | Nguyen et al. | |
| 2020/0334907 | A1* | 10/2020 | Bender | G06F 3/04815 |
| 2021/0304502 | A1* | 9/2021 | Chaurasia | G06F 9/542 |
| 2023/0143767 | A1 | 5/2023 | Forrest et al. | |

FOREIGN PATENT DOCUMENTS

| | | | |
|---|---|---|---|
| JP | 2022-191240 | A | 12/2022 |
| JP | 2023-76451 | A | 6/2023 |
| KR | 10-1101051 | B1 | 12/2011 |
| KR | 10-2054712 | B1 | 1/2020 |
| KR | 10-2124748 | B1 | 6/2020 |
| KR | 10-2250870 | B1 | 5/2021 |
| KR | 10-2023-0128749 | A | 9/2023 |

* cited by examiner

ELECTRONIC DEVICE AND METHOD FOR TRANSMITTING INFORMATION RELATED TO A PROTECTION AREA IN WEARABLE ELECTRONIC DEVICE

CROSS-REFERENCE TO RELATED APPLICATIONS

This application is a continuation of International Application No. PCT/KR2024/015282, designating the United States, filed on Oct. 8, 2024, in the Korean Intellectual Property Receiving Office and claiming priority to Korean Patent Application No. 10-2023-0134194, filed on Oct. 10, 2023, in the Korean Intellectual Property Office, and Korean Patent Application No. 10-2023-0166914, filed on Nov. 27, 2023, in the Korean Intellectual Property Office, the disclosures of each of which are incorporated by reference herein in their entireties.

BACKGROUND

1. Field

The disclosure relates to an electronic device and an operation method of a wearable electronic device that transmits information related to a protection area.

2. Description of Related Art

As digital technologies have developed, electronic devices, including a smartphone, a tablet personal computer (PC), and a personal digital assistant (PDA), have been implemented. Electronic devices have also been developed in a form that may be worn by a user to improve portability and user accessibility.

For example, an electronic device that may be worn by a user is being developed in the form of a wearable electronic device such as augmented reality (AR) glasses, a video see through (VST) device, or a head mounted display (HMD) device, and various services and additional functions are increasingly being provided in such wearable electronic devices. Accordingly, functionality provided via a wearable electronic device has gradually advanced.

AR glasses and VST devices may display a virtual image when worn by a user, and provide, to the user, experience with a sense of reality. The AR glasses or the VST devices may replace the usability of a smartphone in various fields such as game entertainment, education, social network services (SNS), or the like. A user may perceive content provided via AR glasses or a VST device as being similar to reality, and the user may interact with a virtual world.

SUMMARY

In accordance with an aspect of the disclosure, a head mounted display (HMD) device includes: a communication interface; a processor; and memory storing instructions, which, when executed by the processor, cause the HMD device to: execute a first application related to virtual reality, identify a protection area of the HMD device corresponding to the first application, the protection area of the HMD device being set based on a position of the HMD device, and transmit information related to a change in the protection area of the HMD device through the communication interface, based on the protection area of the HMD device changing.

The instructions, when executed by the processor, may cause the HMD device to: based on identifying that a size of the protection area of the HMD device increases, identify a protection area of an external electronic device, and based on identifying that the protection area of the HMD device overlaps with the protection area of the external electronic device, transmit, to the external electronic device, an alarm message through the communication interface.

The instructions, when executed by the processor, may cause the HMD device to, based on identifying that a size of the protection area of the HMD device increases, transmit the information related to the changed protection area of the HMD device through the communication interface.

The information related to the change in the protection area of the HMD device may indicate a center location of the protection area of the HMD device and a radius of the protection area of the HMD device.

The instructions, when executed by the processor, may cause the HMD device to: identify that the protection area of the HMD device is changed from a first protection area to a second protection area according to an execution of a second application related to the virtual reality, and transmit information related to the change in the protection area of the HMD device through the communication interface.

The instructions, when executed by the processor, may cause the HMD device to set or update the protection area of the HMD device based on a user input.

The virtual reality may include any one or any combination of an extended reality (XR), an augmented reality (AR), or a mixed reality (MR).

The instructions, when executed by the processor, may cause the HMD device to: identify information related to an activity of a user wearing the HMD device, and based on the information related to the activity of the user, transmit information related to the change in the protection area of the HMD device through the communication interface.

The instructions, when executed by the processor, may cause the HMD device to transmit information related to an activity of a user wearing the HMD device through the communication interface.

In accordance with an aspect of the disclosure, a method of operating an HMD device, includes: executing a first application related to virtual reality; identifying a protection area based on a location of the HMD device and the first application; and based on a change of the protection area, transmitting information related to the change in the protection area via a communication interface.

The transmitting the information related to the changed protection area may include, based on identifying that a size of the protection area is increased, transmitting information related to the changed protection area via the communication interface.

The information related to the changed protection area may indicate a central location of the protection area and a radius of the protection area.

The method may further include: identifying that the protection area is changed from a first area to a second area, based on a second application related to the virtual reality being executed; and transmitting information related to the change in the protection area via the communication interface.

The method may further include setting or changing the protection area based on a user input.

The information related to the change in the protection area may be broadcasted via the communication interface.

The method may further include: identifying information related to an activity of a user who wears the HMD device;

and based on the information related to the activity of the user, transmitting the information related to the protection area via the communication interface.

The method may further include transmitting the information related to an activity of a user who wears the HMD device via the communication interface.

In accordance with an aspect of the disclosure, a HMD device includes: a communication interface; a processor; and memory storing instructions, which, when executed by the processor, cause the HMD device to: execute a first application related to virtual reality; identify a protection area based on a location of the HMD device and the first application; receive information related to a location of an external electronic device from the external electronic device that executes the first application in the protection area; and transmit the information related to the location of the external electronic device via the communication interface.

The information related to the protection area may indicate a central location of the protection area and a radius of the protection area.

In accordance with an aspect of the disclosure, a non-transitory storage medium is provided. The storage medium stores computer-readable instructions which, when executed by a processor of a HMD device, cause the HMD device to perform operations, the operations including: executing a first application related to virtual reality; identifying a protection area based on a location of the HMD device and the first application; and based on a change of the protection area, transmitting information related to the change via a communication interface of the HMD device.

In accordance with an aspect of the disclosure, a HMD device includes: a communication interface; a processor; and memory storing instructions, which, when executed by the processor, cause the HMD device to: identify a protection area of the HMD device corresponding to a first virtual reality application based on a position of the HMD device and a status of a user of the first virtual reality application, update the protection area based on a change in the status of the user; and transmit information related to the change in the protection area through the communication interface.

The instructions, when executed by the processor, may cause the HMD device to obtain user status information from an external wearable device.

The user status information may indicate any one or any combination of a heart rate, a blood pressure and an arm movement.

The instructions, when executed by the processor, may cause the HMD device to identify the change in the status of the user based on a change indicated by the user status information.

The instructions, when executed by the processor, may cause the HMD device to increase a size of protection area based on the heart rate changing from a first rate to a second rate that is higher than the first rate.

BRIEF DESCRIPTION OF DRAWINGS

The above and other aspects, features and advantages of certain embodiments of the present disclosure will be more apparent from the following description taken in conjunction with the accompanying drawings, in which.

DETAILED DESCRIPTION

Figure 1:
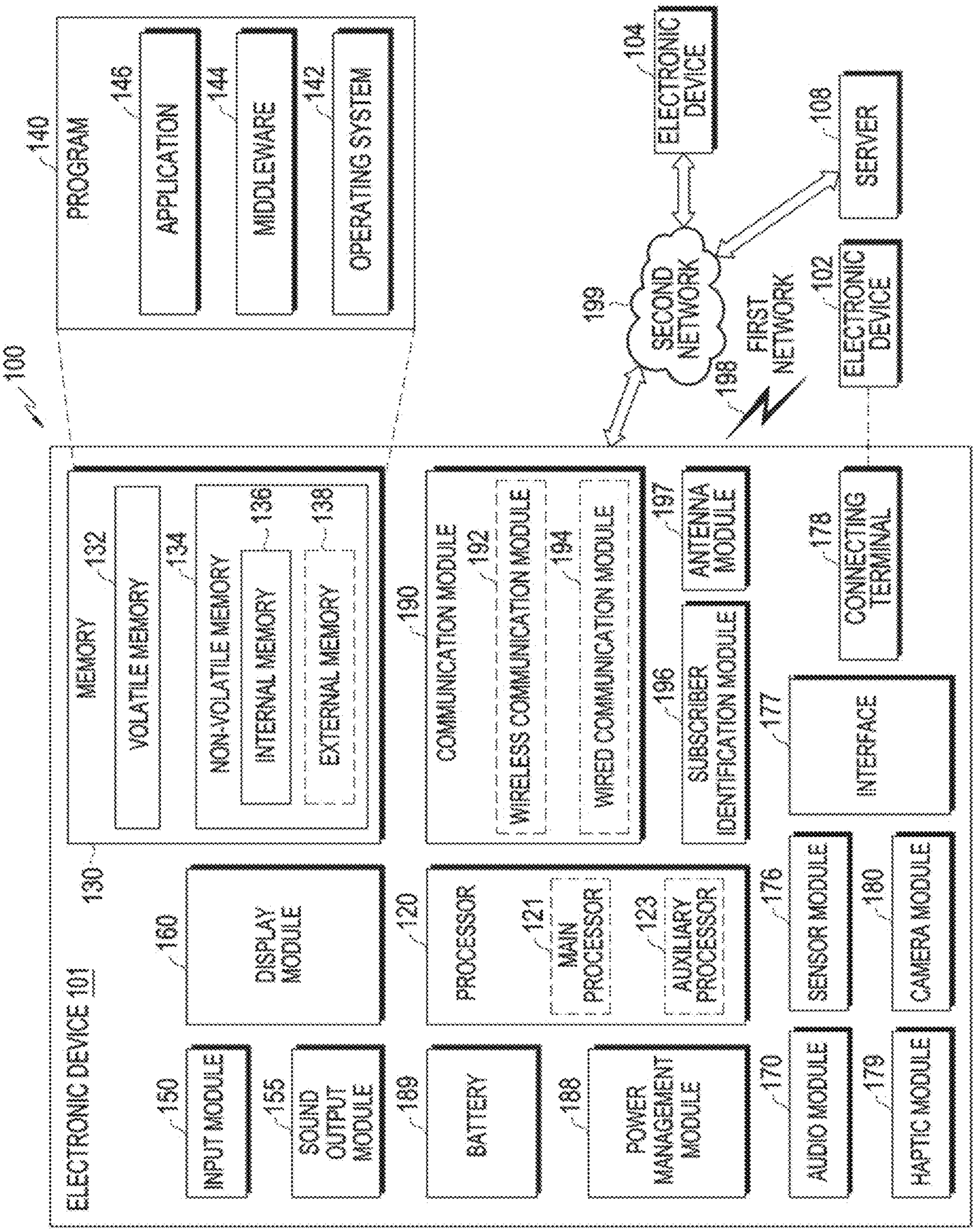
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, embodiments are described in detail with reference to the accompanying drawings. Like components are denoted by like reference numerals throughout the specification, and repeated descriptions thereof are omitted. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure.

Figure 2:
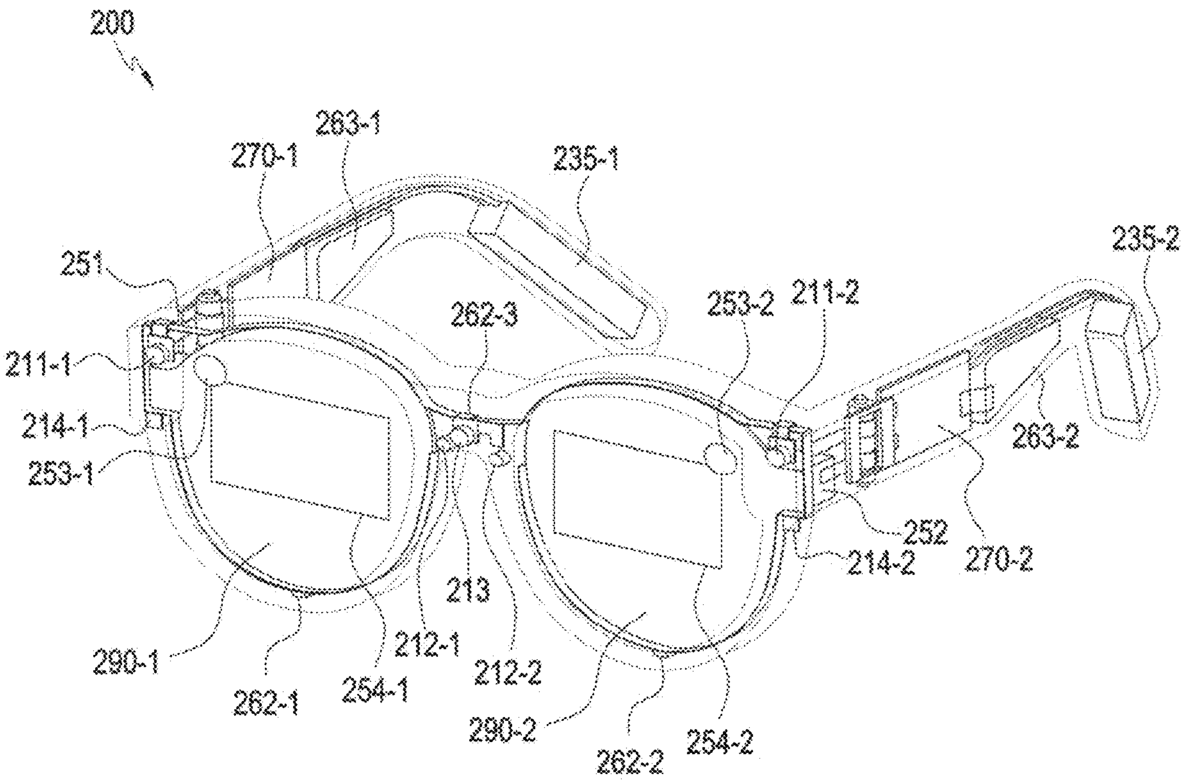
FIG. 2 is a perspective view of a wearable electronic device according to an embodiment.

FIG. 2 is a diagram illustrating the structure of a wearable electronic device according to various embodiments.

Referring to FIG. 2, according to an embodiment, a wearable electronic device (e.g., the HMD device 200) may include one or more first cameras 211-1 and 211-2, one or more second cameras 212-1 and 212-2, and one or more third cameras 213. According to an embodiment, an image obtained via the one or more first cameras 211-1 and 211-2 may be used for detecting a hand gesture made by a user, tracking the head of a user, and/or awareness of space. According to an embodiment, the one or more first cameras 211-1 and 211-2 may be global shutter (GS) cameras.

According to an embodiment, the one or more first cameras 211-1 and 211-2 may perform a simultaneous localization and mapping (SLAM) operation via depth shooting. According to an embodiment, the one or more first cameras 211-1 and 211-2 may perform awareness of space operations for 6 degrees of freedom (6DoF).

According to an embodiment, an image obtained via the one or more second cameras 212-1 and 212-2 may be used for detecting and tracking the pupils of a user. According to an embodiment, the one or more second cameras 212-1 and 212-2 may be GS cameras. According to an embodiment, the one or more second cameras 212-1 and 212-2 may correspond to the left eye and the right eye of a user, respectively, and the performance of the one or more second cameras 212-1 and 212-2 may be the same.

According to an embodiment, the one or more third cameras 213 may be high-resolution cameras. For example, the one or more third cameras 213 may have a higher resolution than the one or more second cameras 212-1 and 212-2. According to an embodiment, the one or more third cameras 213 may perform an auto-focusing (AF) function and an optical image stabilization function. According to an embodiment, the one or more third cameras 213 may be GS cameras or rolling shutter (RS) cameras.

According to an embodiment, the HMD device 200 may include one or more light emitting devices 214-1 and 214-2. The light emitting devices 214-1 and 214-2 may be different from a light source that emits light to a screen output area of a display, which is described below. According to an embodiment, the light emitting devices 214-1 and 214-2 may emit light to illuminate the pupils of a user when detecting and tracking the pupils of the user via the one or more second cameras 212-1 and 212-2. According to an embodiment, each of the light emitting device 214-1 and 214-2 may include an LED. According to an embodiment, the light emitting devices 214-1 and 214-2 may emit infrared light. According to an embodiment, the light emitting devices 214-1 and 214-2 may be attached around the frame of the HMD device 200. According to an embodiment, if the light emitting devices 214-1 and 214-2 are located around the one or more first cameras 211-1 and 211-2, and the HMD device 200 is used in a dark environment, the light emitting devices 214-1 and 214-2 may assist gesture detection, head tracking, and space awareness operations performed using the one or more first cameras 211-1 and 211-2. According to an embodiment, in the case in which the light emitting devices 214-1 and 214-2 are located around the one or more third cameras 213, and the HMD device 200 is used in a dark environment, the light emitting devices 214-1 and 214-2 may assist the one or more third camera 213 to obtain an image.

According to an embodiment, the HMD device 200 may include batteries 235-1 and 235-2. The batteries 235-1 and 235-2 may store power for operating the remaining components of the HMD device 200.

According to an embodiment, the HMD device 200 may include a first display 251, a second display 252, one or more input optical members 253-1 and 253-2, and/or one or more transparent members 290-1 and 290-2 including one or more screen display parts 254-1 and 254-2. According to an embodiment, the first display 251 and the second display 252 may include, for example, a liquid crystal display (LCD), a digital mirror device (DMD), a liquid crystal on silicon (LCoS), an organic light emitting diode (OLED), or a micro light emitting diode (micro LED). According to an embodiment, if the first display 251 and the second display 252 are embodied as one of an LCD, a DMD, or an LCOS, the HMD device 200 may include a light source that emits light to the screen output area of the display. According to another embodiment, if the first display 251 and the second display 252 are emissive displays, for example, if the first display 251 and the second display 252 are embodied as one of an OLED or a micro LED, the HMD device 200 may provide a virtual image to a user although the HMD device 200 does not include a separate light source.

According to an embodiment, the one or more transparent members 290-1 and 290-2 may be disposed to face the eyes of a user when the user wears the HMD device 200. According to an embodiment, the one or more transparent members 290-1 and 290-2 may include at least one of a glass plate, a plastic plate, or a polymer. According to an embodiment, if a user wears the HMD device 200, the user may view the outside world via the one or more transparent members 290-1 and 290-2. According to an embodiment, the one or more input optical members 253-1 and 253-2 may guide a light produced from the first display 251 and the second display 252 to the eyes of a user. According to an embodiment, an image based on a light produced by the first display 251 and the second display 252 is formed on the one or more screen display parts 254-1 and 254-2 of the one or more transparent members 290-1 and 290-2, and a user may view the image formed on the one or more screen display parts 254-1 and 254-2.

According to an embodiment, the HMD device 200 may include one or more optical waveguides. The optical waveguides may transfer a light produced by the first display 251 and the second display 252 to the eyes of a user. The HMD device 200 may include an optical waveguide for each of the left eye and the right eye of a user. According to an embodiment, an optical waveguide may include at least one of glass, plastic, or polymer. According to an embodiment, the optical waveguide may have a nano pattern formed in one inner or outer surface, for example, a polygonal or curved surface shape grating structure. According to an embodiment, the optical waveguide may include a free-form type prism, and, in this instance, the optical waveguide may provide an incident light to a user via a reflection mirror. According to an embodiment, the optical waveguide may include at least one among at least one diffractive element (e.g., a diffractive optical element (DOE), a holographic optical element (HOE)) or a reflective element (e.g., a reflective mirror), and may guide a display light emitted from a light source to the eyes of a user by using at least one diffractive element or reflective element included in the optical waveguide. According to various embodiments, the diffractive element may include an input/output optical member. According to various embodiments, the reflective element may include a member that causes total reflection.

According to an embodiment, the HMD device 200 may include one or more voice input devices (i.e., one or more microphones or voice input interfaces) 262-1, 262-2, and 262-3, and one or more voice output devices 263-1 and 263-2 (i.e., one or more output speakers or voice output interfaces).

According to an embodiment, the HMD device 200 may include a first PCB 270-1 and a second PCB 270-2. The first PCB 270-1 and the second PCB 270-2 may transfer an electrical signal to at least some of the components included in the HMD device 200. According to an embodiment, the first PCB 270-1 and the second PCB 270-2 may be FPCBs. According to an embodiment, the first PCB 270-1 and the second PCB 270-2 may include a first board, a second board, and an interposer disposed between the first board and the second board.

FIG. 2 illustrates a see-through type HMD device, but the disclosure is not limited thereto. A method of providing an augmented reality image to be described below may be applicable equally or similarly to a see-closed type HMD device.

Figure 3:
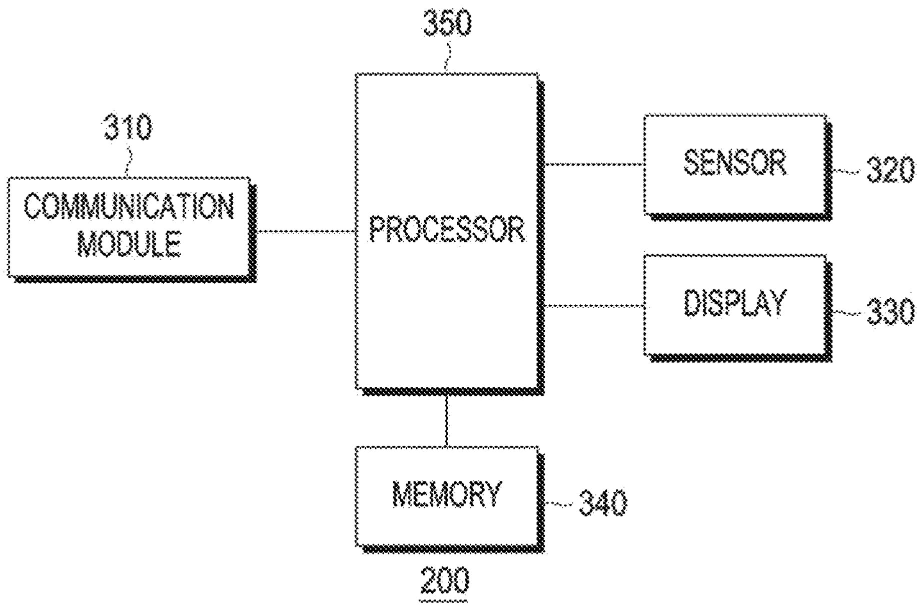
FIG. 3 is a block diagram of components of a wearable electronic device and electronic device according to an embodiment.

FIG. 3 is a block diagram illustrating an electronic device according to various embodiments.

Referring to FIG. 3, according to an embodiment, an electronic device (e.g., the HMD device 200) according to an embodiment may include a communication module 310 (i.e., a communication interface), a sensor 320, a display 330, memory 340, and/or a processor 350.

According to an embodiment, the communication module 310 may be a component that is at least partially the same as or similar to the communication module 190 of FIG. 1.

According to an embodiment, the communication module 310 may communicate with an external electronic device (e.g., the electronic device 102, the electronic device 104, or the server 108 of FIG. 1).

According to an embodiment, the communication module 310 may receive information for obtaining a location of the HMD device 200 (e.g., three-dimensional coordinates of the HMD device 200) from the external electronic device. For example, an ultra-wideband (UWB) communication module included in the communication module 310 may receive information associated with a location of the external electronic device, a distance between the external electronic device and the HMD device 200, and/or a direction between the external electronic device and the HMD device 200, which is used for obtaining (e.g., calculating) the three-dimensional coordinates (e.g., latitude, longitude, and altitude) of the HMD device 200. In this instance, the communication module 310 for receiving the information to be used for obtaining the location of the HMD device 200 is not limited to the UWB communication module. For example, the communication module 310 may include a short-range communication module (e.g., Bluetooth, Wi-Fi) for receiving, from the external electronic device, information to be used for obtaining the location of the HMD device 200. According to an embodiment, the HMD device 200 may receive information to be used for obtaining the location of the HMD device 200 from the external electronic device by recognizing a quick response (QR) code displayed in the external electronic device.

According to an embodiment, the communication module 310 may include a global navigation satellite system (GNSS) communication module (e.g., global positioning system (GPS) communication module) for obtaining the location of the HMD device 200.

According to an embodiment, the sensor 320 may include a component for obtaining information associated with a surrounding environment of the HMD device 200.

According to an embodiment, the sensor 320 may include a component for obtaining information associated with a distance between the HMD device 200 and each of a plurality of objects (also referred to as 'a plurality of things' or 'a plurality of objects') (e.g., a plurality of objects located in at least a part of the space surrounding the HMD device 200) located in a surrounding environment (or also referred to as a 'surrounding space') of the HMD device 200. For example, the sensor 320 may include a depth vision time of flight (TOF) camera capable of calculating a distance between the HMD device 200 and an object based on a period of time spent while a light (e.g., infrared light) emitted from a light emitting device is reflected by the object and returns to a light receiving device, and a phase difference between a light emitted from a light emitting device and a light that is reflected by the object and returns to the light receiving device. As another example, the sensor 320 may include a LIDAR TOF camera that measures a period of time for a pulse of a light emitted from a light emitting device to return to a light receiving device after being reflected by an object, so as to calculate the distance between the HMD device 200 and an object. As another example, the sensor 320 may include a stereo vision camera that calculates a disparity between two-dimensional (2D) left and right images obtained using two 2D image sensors, so as to calculate a distance between the HMD device 200 and an object. As another example, the sensor 320 may include an image sensor that projects a structuralized pattern (e.g., a structuralized pattern of a set) to an object via a light emitting device, and captures the structuralized pattern distorted by the object, so as to calculate a distance between the HMD device 200 and the object. In this instance, a sensor for obtaining information associated with a surrounding environment of the HMD device 200 is not limited to the above-described examples.

According to an embodiment, the sensor 320 may include a camera (e.g., an RGB camera which captures light in red, green, and blue wavelengths) for recognition (e.g., detection and segmentation) of a plurality of objects located in the space around the HMD device 200.

According to an embodiment, the sensor 320 may include a component for obtaining information associated with a movement and/or a state of the HMD device 200. For example, the sensor 320 may include an acceleration sensor (e.g., 6-axis acceleration sensor) and/or gyro sensor for obtaining information associated with a movement of the HMD device 200, a rotation of the HMD device 200, and/or a direction in which the HMD device faces.

According to an embodiment, the display 330 may be a component that is at least partially the same as or similar to the display module 160 of FIG. 1. According to an embodiment, the display 330 may include the first display 251 and/or the second display 252.

According to an embodiment, the memory 340 may be a component that is at least partially the same as or similar to the memory 130 of FIG. 1. The memory 340 may store various pieces of information, and various pieces of information that the memory 340 store are described in detail later.

According to an embodiment, the processor 350 may be a component that is at least partially the same as or similar to the processor 120 of FIG. 1. According to an embodiment, the processor 350 may include one or more processors. According to an embodiment, the processor 350 may perform overall control of an operation that provides a virtual reality (VR) or augmented reality (AR) image. According to an embodiment, the processor 350 may execute a VR-related application. The processor 350 may set a protection area corresponding to the application in a VR space. An operation that provides, by the processor 350, a virtual reality or augmented reality image, and various operations executed via the provided virtual reality or augmented reality image are described in detail with reference to FIG. 4 below.

Although FIG. 3 illustrates that the HMD device 200 includes the communication module 310, the sensor 320, the display 330, the memory 340, and/or the processor 350, the disclosure is not limited thereto. According to an embodiment, the HMD device 200 may further include at least one component included in the electronic device 101 of FIG. 1 or the HMD device 200 of FIG. 2. For example, the HMD device 200 may further include the one or more transparent members 290-1 and 290-2 and an audio device (e.g., the one or more voice input devices 262-1, 262-2, and 262-3 and one or more voice output devices 263-1 and 263-2). According to an embodiment, the processor 350 may provide a virtual reality or augmented reality image via the display 330, and an augmented reality image may be provided to a user via the one or more transparent members 290-1 and 290-2. For example, all or at least some of the one or more transparent members 290-1 and 290-2 may include the display parts 254-1 and 254-2 capable of providing an augmented reality image.

According to an embodiment, the electronic device 200 (e.g., the processor 350) may execute a first application related to a VR. The processor 350 may identify a protection area set to correspond to the first application in the VR space. The protection area may be a virtual area within a space where a user of the electronic device 200 is located. The protection area may be set to enable a user to safely do an activity when an application related to a VR is executed. For example, the protection area may be an area in the form of a circle, a cylinder, or a sphere which has a radius set based on the center of the electronic device 200. According to an embodiment, the protection area may be set in consideration of the shape of the space where a user of the electronic device 200 is located. For example, in the case in which an obstacle or a wall is present in a space where the user is located, the protection area may be set in consideration of the obstacle or wall. According to an embodiment, when the first application is executed, the protection area may be set based on the characteristic (e.g., a static characteristic or a dynamic characteristic) of the application. The protection area may be set by a user before or after execution of the first application. The protection area may be referred to as a 'safe protection area', 'safety protection area', 'effective safe area', or the like, but is not limited thereto. A detailed description related to the protection area is provided below with reference to FIGS. 5A and 5B.

According to an embodiment, the electronic device 200 (e.g., under control of the processor 350) may transmit information related to the protection area via the communication module 310, and may report the information related to the protection area to at least one external electronic device. For example, the processor 350 may control transmission of information related to the protection area (e.g., the central location of the protection area and the radius of the protection area), and at least one external electronic device may identify the protection area of the electronic device 200 based on the information. The at least one external electronic device may identify the protection area of the electronic device 200 based on the information, and may identify a radius range in which a user who wears the electronic device 200 moves around.

According to an embodiment, the electronic device 200 (e.g., the processor 350) may identify whether the protection area set to correspond to the first application is changed in the VR space. For example, the protection area may be changed when a new application (e.g., a second application) is executed. As another example, the protection area may be changed when a user sets a new protection area. According to an embodiment, based on a change of the protection area, the processor 350 may transmit information related to a changed protection area via the communication module 310. For example, when the size of the protection area is increased, the processor 350 may control transmission of the information related to the protection area having an increased size via the communication module 310. At least one external electronic device may identify the changed protection area based on the information, which is transmitted from the electronic device 200, and may predict a rapid change of a movement of the body of a user who wears the electronic device 200, thereby preventing a collision in advance.

According to an embodiment, the electronic device 200 (e.g., under control of the processor 350) may transmit information related to the first application via the communication module 310, and may report the information related to the first application to at least one external electronic device. For example, the processor 350 may control transmission of the information related to the first application, and at least one external electronic device may identify the type of a VR executed in the electronic device 200. The at least one external electronic device may identify the application executed in the electronic device 200 based on the information, and may predict a movement of a user who wears the electronic device 200.

According to an embodiment, the electronic device 200 (e.g., under control of the processor 350) may transmit information related to an activity (or a movement) of a user who wears the electronic device 200 via the communication module 310. For example, the processor 350 may control transmission of information related to an activity (or a movement) of a user who wears the electronic device 200, and at least one external electronic device may predict a degree of intensity of a movement of the user who wears the electronic device 200. According to an embodiment, the information related to the activity (or movement) of the user may be obtained via the sensor 320 included in the electronic device 200. According to another embodiment, the information related to the activity (or movement) of the user may be obtained from another wearable electronic device (e.g., a watch-type electronic device, a ring-type electronic device, a bracelet-type electronic device, or the like) that the user wears, and the obtained information related to the activity (or movement) of the user may be received via the communication module 310.

Figure 4:
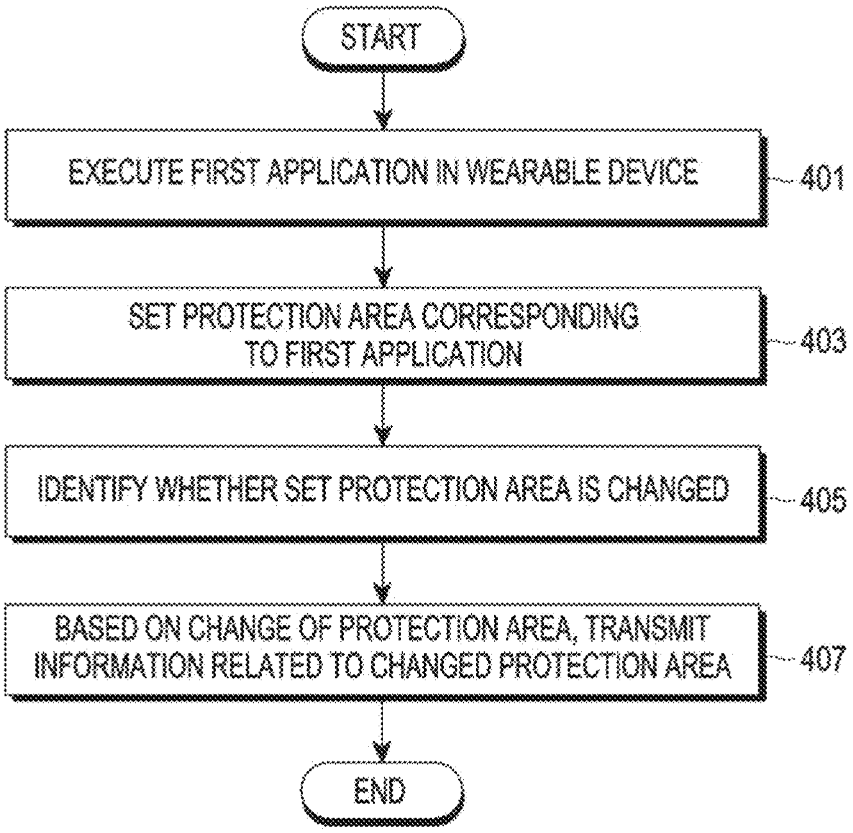
FIG. 4 is a flowchart illustrating transmission of information related to a protection area by an electronic device according to an embodiment.

FIG. 4 is a flowchart illustrating transmission of information related to a protection area by an electronic device according to an embodiment.

In embodiments described herein, operations may be performed sequentially, but the order is not necessarily sequential. For example, the order of operations may be changed, and at least two operations may be performed in parallel. Depending on embodiment, a predetermined operation may be omitted.

Referring to FIG. 4, according to an embodiment, a processor (e.g., the processor 350 of FIG. 3) of a wearable electronic device (e.g., the electronic device 200 of FIG. 3) may execute a first application in operation 401. For example, the first application may be a VR-related application, but is not limited thereto.

According to an embodiment, in operation 403, the electronic device 200 (e.g., the processor 350) may set a protection area that is set to correspond to the first application in a VR space produced as the first application is executed, or may identify a previously set protection area. As described above, the protection area may be a virtual area set to enable a user to safely do an activity when a VR-related application is executed. According to an embodiment, when the first application is executed, the protection area may be set based on the characteristic (e.g., a static characteristic or a dynamic characteristic) of the application. The protection area may be set by a user before or after execution of the first application. The protection area may be referred to as a 'safe protection area', a 'safe protection boundary', an 'effective safe area', or the like, but is not limited to the term. A detailed description related to the protection area is provided below with reference to FIGS. 5A and 5B.

According to an embodiment, in operation 405, the electronic device 200 (e.g., the processor 350) may identify whether the protection area set to correspond to the first application is changed in the VR space. For example, the protection area may be changed when a new application (e.g., a second application) is executed. As another example, the protection area may be changed when a user newly set a protection area. As used herein, a term relates to 'identify' may correspond to 'detect', 'recognize', 'determine', and/or 'sense'.

According to an embodiment, in operation 407, based on a change of the protection area, the electronic device 200 (e.g., under control of the processor 350) may transmit information related to the changed protection area via a communication module (e.g., the communication module 310 of FIG. 3). For example, when the size of the protection area is increased, the processor 350 may control transmission of information related to the protection area having an increased size via the communication module 310. At least one external electronic device may identify the changed protection area based on the information which is transmitted from the electronic device 200, and may predict a rapid change of a movement of the body of a user who wears the electronic device 200, thereby preventing a collision in advance.

Figure 5A:
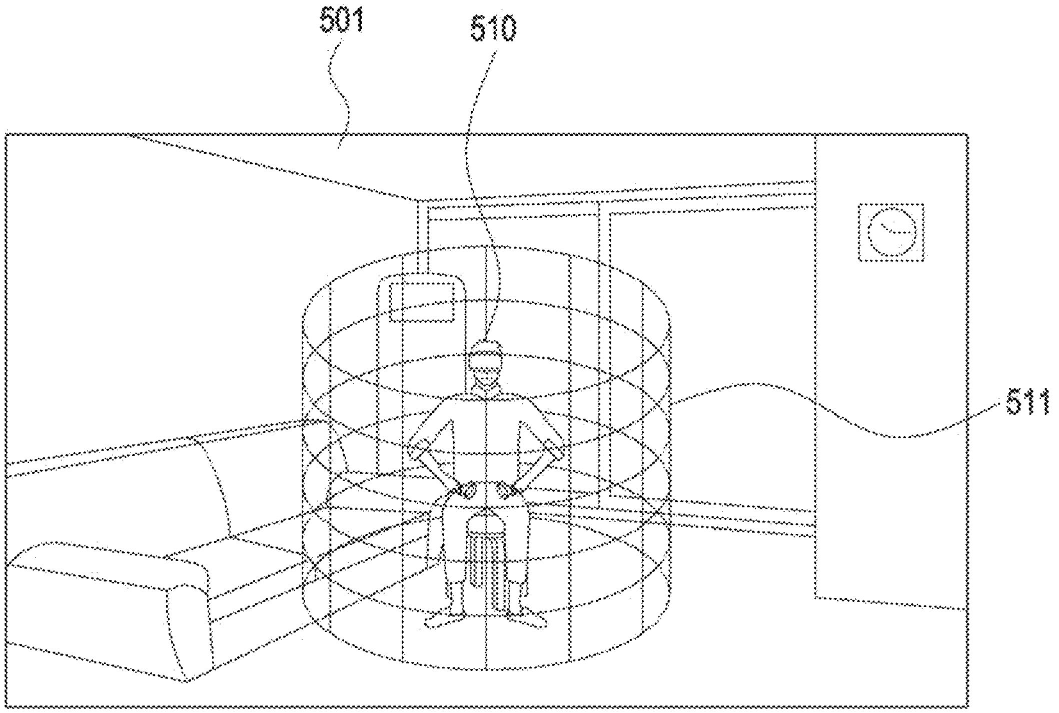
FIG. 5A is a diagram illustrating a protection area set by an electronic device according to an embodiment.
Figure 5B:
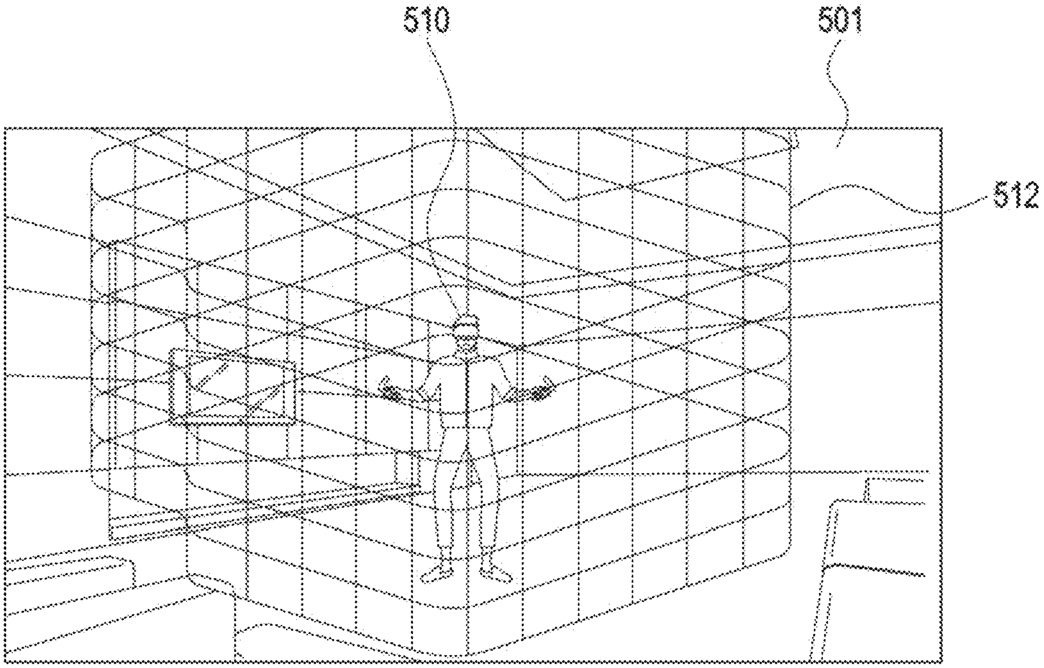
FIG. 5B is a diagram illustrating a protection area set by an electronic device according to an embodiment.

FIG. 5A and FIG. 5B are diagrams illustrating examples of a protection area set by an electronic device according to an embodiment.

Referring to FIGS. 5A and 5B, a user wears a wearable electronic device 510 (e.g., an HMD device), and may execute a VR-related application via the wearable electronic device 510. For example, when the VR-related application is executed in the wearable electronic device 510, a protection area 511 corresponding to the executed application may be set. The protection area 511 may be a virtual area set to enable the user who wears the wearable electronic device 510 to safely do an activity in a real space 501 while the VR-related application is executed.

According to an embodiment, as illustrated in FIG. 5A, the protection area 511 may be formed in a cylinder type. According to another embodiment, the protection area 511 may be formed in a sphere type. The protection area 511 may be set by using a point at which the user is located when the user initially executes an application as a central location. Accordingly, the protection area 511 may be expressed by the central location where the user is initially located and a radius, but the protection area 511 is not limited thereto. According to an embodiment, as described above, the protection area 511 may be changed to a new protection area that is set to correspond to a changed application as the executed application is changed. In addition, according to another embodiment, while the same application is executed, the protection area 511 may be changed when the user resets the protection area 511.

According to an embodiment, as illustrated in FIG. 5B, a protection area 512 may be automatically set based on the size of the real space 501 or a location of an object or a thing disposed in the real space 501. In the case in which the protection area 512 is automatically set in consideration of the real space 501, the protection area 512 may be changed as the location of an object or a thing disposed in the real space 510 is changed.

According to an embodiment, when an application is executed, the protection area 511 and 512 may be set based on a characteristic (e.g., a static characteristic or a dynamic characteristic) of the application. For example, in the case in which a VR-related application executed in the electronic device is an application having a static characteristic (e.g., an application that is executed while a user is in a sitting position as illustrated in FIG. 5A), the protection area 511 that is a relatively small area may be set. Conversely, in the case in which the VR-related application is an application having a dynamic characteristic (e.g., an application that is executed while a user is moving as illustrated in FIG. 5B), the protection area 512 that is a relatively large area may be set.

As described above, according to an embodiment, the protection area may be set by a user before or after execution of the application. The protection area may be referred to as a 'safe protection area', a 'safe protection boundary', an 'effective safe area', or the like, but is not limited to the term.

When the user executes a VR-related application in the state of wearing the wearable electronic device 510, the user may safely do an activity by moving within the set protection area 511 and 512. According to an embodiment, in the case in which another user who wears another wearable electronic device is present around the user who wears the wearable electronic device 510, which type of application the user uses may be estimated based on a movement of the user who wears the wearable electronic device 510. For example, the other user may estimate which type of application the user uses by viewing a movement of the user who wears the wearable electronic device 510. However, the user who wears the wearable electronic device 510 rapidly changes the application, or rapidly changes the protection area, the other user around the user may have difficulty in predicting a movement of the user who wears the wearable electronic device 510. Accordingly, a collision may occur between the bodies of a VR user and an AR user, or between the bodies of a VR user and a VR user. Hereinafter, various embodiments associated with preventing of a collision by transmitting information related to a protection area from the wearable electronic device 510 will be described.

Figure 6:
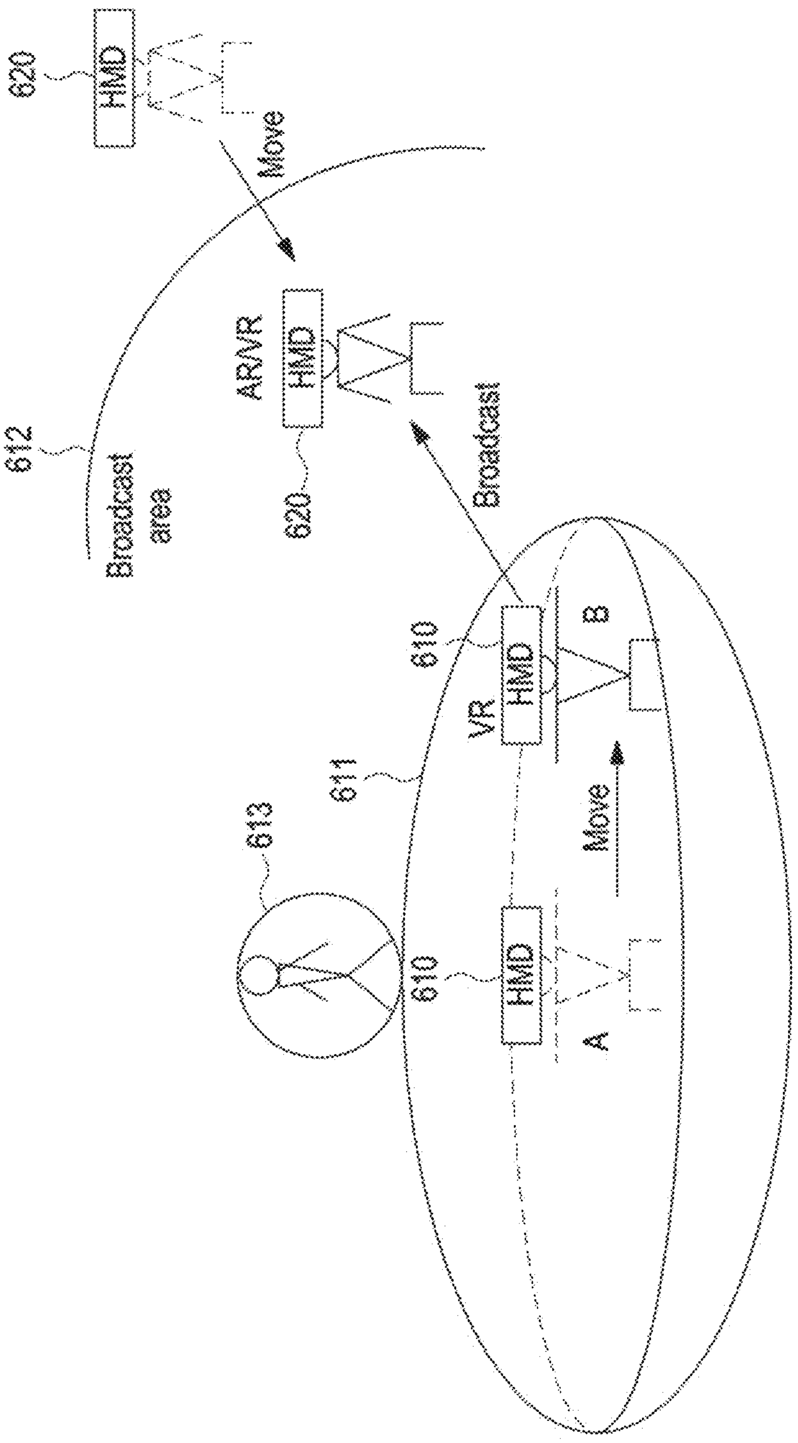
FIG. 6 is a diagram illustrating an operation of transmitting information related to a protection area by an electronic device according to an embodiment.

FIG. 6 is a diagram illustrating an operation of transmitting information related to a protection area by an electronic device according to an embodiment.

Referring to FIG. 6, a user who wears a first electronic device 610 (e.g., a wearable electronic device) may move from location A to location B. According to an embodiment, a VR-related application may be executed in the first electronic device 610. As the VR-related application is executed, a protection area 611 corresponding to the application may be set. The central location of the protection area 611 may be set to location A where the user is initially located irrespective of a change of the location of the user wearing the first electronic device 610.

According to an embodiment, the first electronic device 610 may transmit information related to the protection area 611. The information related to the protection area 611 may be broadcasted from the first electronic device 610 via a communication module (e.g., the communication module 310 of FIG. 3). For example, the first electronic device 610 may broadcast the information related to the protection area 611 to electronic devices located within a predetermined distance by using a short-range communication scheme. According to an embodiment, the first electronic device 510 may broadcast the information related to the protection area 611, thereby simultaneously transmitting the information related to the protection area 611 to a plurality of electronic devices. The short-range communication scheme may include a Bluetooth communication scheme via a Bluetooth module and an ultra-wide band (UWB) communication scheme via a UWB communication module, but the short-distance communication scheme is not limited thereto. The information related to the protection area 611 may indicate the central location of the protection area and the radius of the protection area, but the information related to the protection area is not limited thereto. As the information related to the protection area 611 is broadcasted, an electronic device (e.g., a second electronic device 620) located in a broadcasting area 612 may receive the information related to the protection area 611 transmitted from the first electronic device 610. For example, by moving from the outside of the broadcasting area 612 of the first electronic device 610 to the inside of the broadcasting area 612, the second electronic device 620 may receive the information related to the protection area 611, which is transmitted from the first electronic device 610.

According to an embodiment, based on a change of the protection area 611, the first electronic device 610 may transmit the information related to the protection area 611. For example, a first protection area (or a first area) may be set as the first electronic device 610 executes a first application. In the case in which a second application is executed, after execution of the first application, the first protection area (or first area) may be changed to a second protection area (or a second area). The first electronic device 610 may broadcast information related to the second protection area. According to an embodiment, in the case in which the size of the second protection area is larger than the first protection area, the first electronic device 610 may broadcast information related to the second protection area. For example, in the case in which the radius of the second protection area is greater than the radius of the first protection area, the first electronic device 610 may broadcast the information related to the second protection area to electronic devices located within a predetermined distance by using Bluetooth communication. According to another embodiment, in the case in which the size of the second protection area exceeds a predetermined threshold value, the first electronic device 610 may broadcast information related to the second protection area. According to another embodiment, in the case in which a difference in size between the second protection area and the first protection area exceeds a predetermined threshold value, the first electronic device 610 may broadcast information related to the second protection area. According to an embodiment, the protection area may be the first protection area having a size which does not exceed the predetermined threshold value. The first electronic device may initially broadcast the information related to the first protection area using a first communication technology, such as Bluetooth communication. The protection area may change from the first protection area to the second protection area having a size which exceeds the predetermined threshold value. Based on the change, the first electronic device 610 may cease broadcasting the information using the first communication technology and initiate broadcasting the information indicating the second protection area using a different communication technology.

According to an embodiment, the first electronic device 610 may obtain the information related to an activity of the user who wears the first electronic device 610. For example, as described above, the first electronic device 610 may obtain the information related to the activity of the user via a sensor (e.g., the sensor 320 of FIG. 3). According to another embodiment, the first electronic device 610 may obtain the information related to the activity of the user from another wearable electronic device that the user wears (e.g., a watch-type electronic device, a ring-type electronic device, a bracelet-type electronic device, or the like). For example, the information related to the activity of the user may further include information related to the body of the user, and information related to a predictable user activity from an application being executed.

According to an embodiment, the information related to the activity of the user may be displayed in the form of an icon 613, an image, or text on a display of the first electronic device 610 or the second electronic device 620. According to an embodiment, the information related to the activity of the user may be output in the form of sound (or voice or alarm) in the first electronic device 610 or the second electronic device 620. According to an embodiment, the information related to the activity of the user (e.g., icon, image, text, voice data) may be transmitted from the first electronic device 610 to the second electronic device 620. The second electronic device 620 may receive, from the first electronic device 610, information related to the protection area 611 and the information related to the activity of the user who wears the first electronic device 610, and may display the information received from the first electronic device 610 on a display of the second electronic device 620 or may output the same via a speaker. A user who wears the second electronic device 620 may identify information (e.g., the protection area 611 and/or icon 613) displayed on the display of the second electronic device 620, and may predict a movement of the user who wears the first electronic device 610, thereby preventing a collision. According to an embodiment, the second electronic device 620 may be a wearable electronic device (e.g., an HMD device), but it is not limited thereto. The second electronic device 620 may execute an AR-related application or a VR-related application. For example, while executing an AR-related application or a VR-related application via the second electronic device 620, the user who wears the second electronic device 620 may predict a movement of the user who wears the first electronic device 610, thereby preventing a collision therebetween.

According to an embodiment, the first electronic device 610 may broadcast the information related to the protection area 611 or the information related to the activity of the user who wears the first electronic device 610 via a short-range communication device (e.g., a UWB, Bluetooth, or the like).

According to another embodiment, the first electronic device 610 may transmit the information related to the protection area 611 and the information related to the activity of the user who wears the first electronic device 610 to a server via a network, and the server may transmit the information received from the first electronic device 610 to an electronic device (e.g., the second electronic device 620) adjacent to the first electronic device 610. According to an embodiment, the electronic device (e.g., the second electronic device 620) adjacent to the first electronic device 610 may be identified via a GPS system. According to another embodiment, an adjacent electronic device (e.g., the second electronic device 620) may be identified by recognizing the distance between electronic devices and/or locations thereof via UWB communication, and identifying relative locations of the electronic devices.

Figure 7:
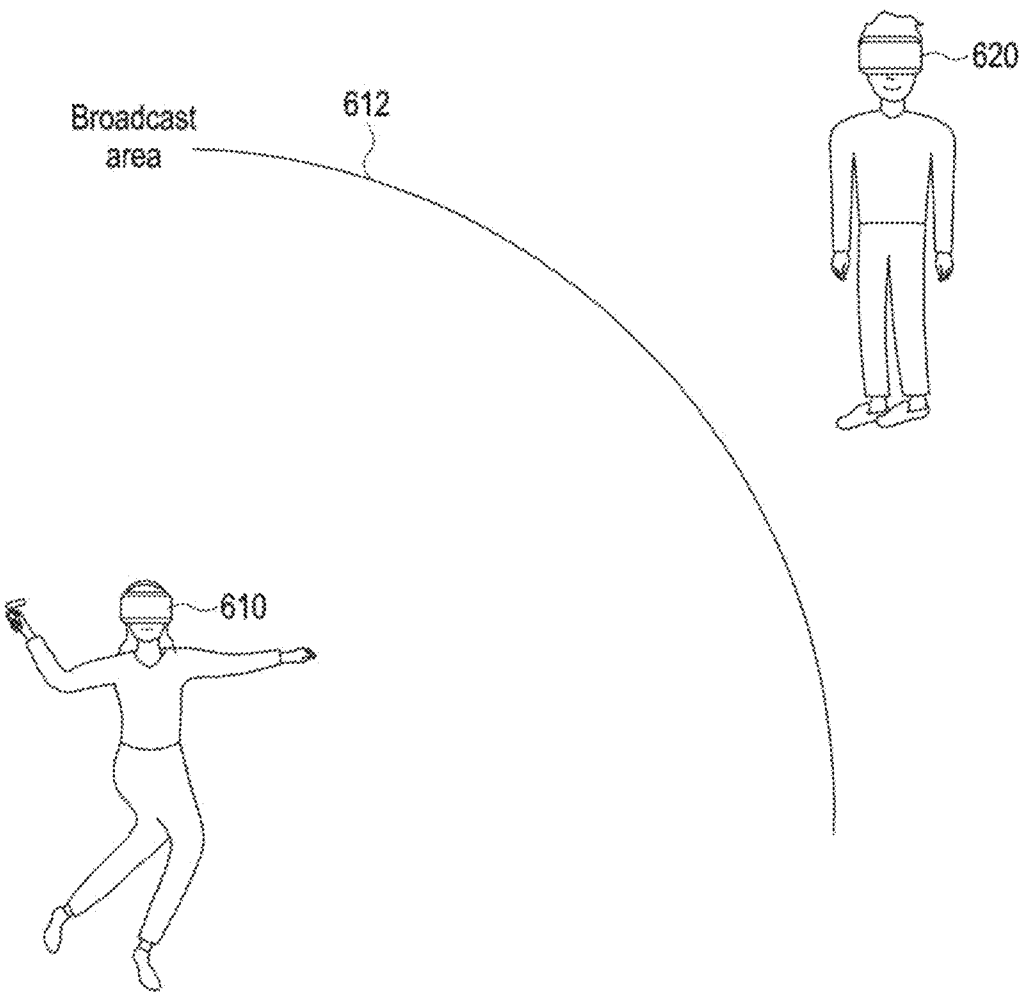
FIG. 7 is a diagram illustrating an operation of transmitting information related to a protection area by an electronic device according to an embodiment.

FIG. 7 is a diagram illustrating an operation of transmitting information related to a protection area by an electronic device according to an embodiment.

Referring to FIG. 7, according to an embodiment, the first electronic device 610 may continuously or periodically broadcast information related to a protection area even in the case in which another electronic device (e.g., the second electronic device 620) is not located in the broadcasting area 612.

Figure 8:
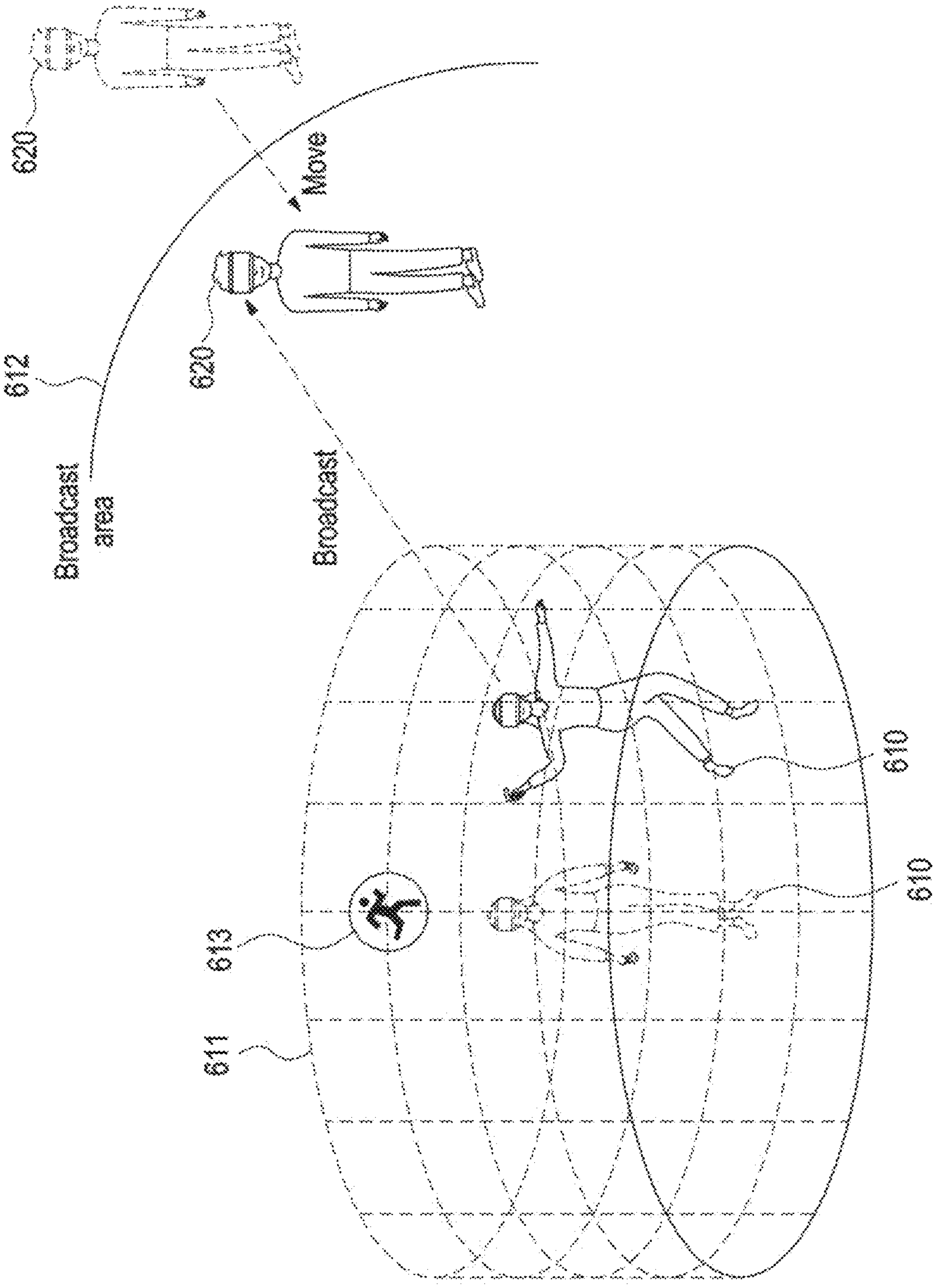
FIG. 8 is a diagram illustrating an operation of transmitting information related to a protection area by an electronic device according to an embodiment.

FIG. 8 is a diagram illustrating an operation of transmitting information related to a protection area by an electronic device according to an embodiment.

Referring to FIG. 8, according to an embodiment, the first electronic device 610 may not broadcast information related to a protection area in the case in which another electronic device (e.g., the second electronic device 620) is not located in the broadcasting area 612. Subsequently, in the case in which the second electronic device 620 moves from outside the broadcast area 612 of the first electronic device 610 to be located in the broadcasting area 612 of the first electronic device 610, the first electronic device 610 may broadcast information related to the protection area. According to an embodiment, the first electronic device 610 and the second electronic device 620 may transmit a beacon signal at regular intervals in order to identify whether another electronic device (e.g., the first electronic device 610 may identify the second electronic device 620) is located in the broadcasting area 612. The first electronic device 610 and the second electronic device 620 may monitor for the beacon signal. When receiving, from an external electronic device, a signal that corresponds to the transmitted beacon signal, the first electronic device 610 may determine that the external electronic device is located in the broadcasting area 612.

According to an embodiment, as illustrated in FIG. 8, in the case in which a user who wears the first electronic device 610 is changed from a static state to an active state, information related to the icon 613 corresponding to the active state may be broadcasted. The second electronic device 620 may receive the information broadcasted from the first electronic device 610, and may identify the degree of the activity of the user who wears the first electronic device 610 based on the information, thereby predicting a movement.

Figure 9:
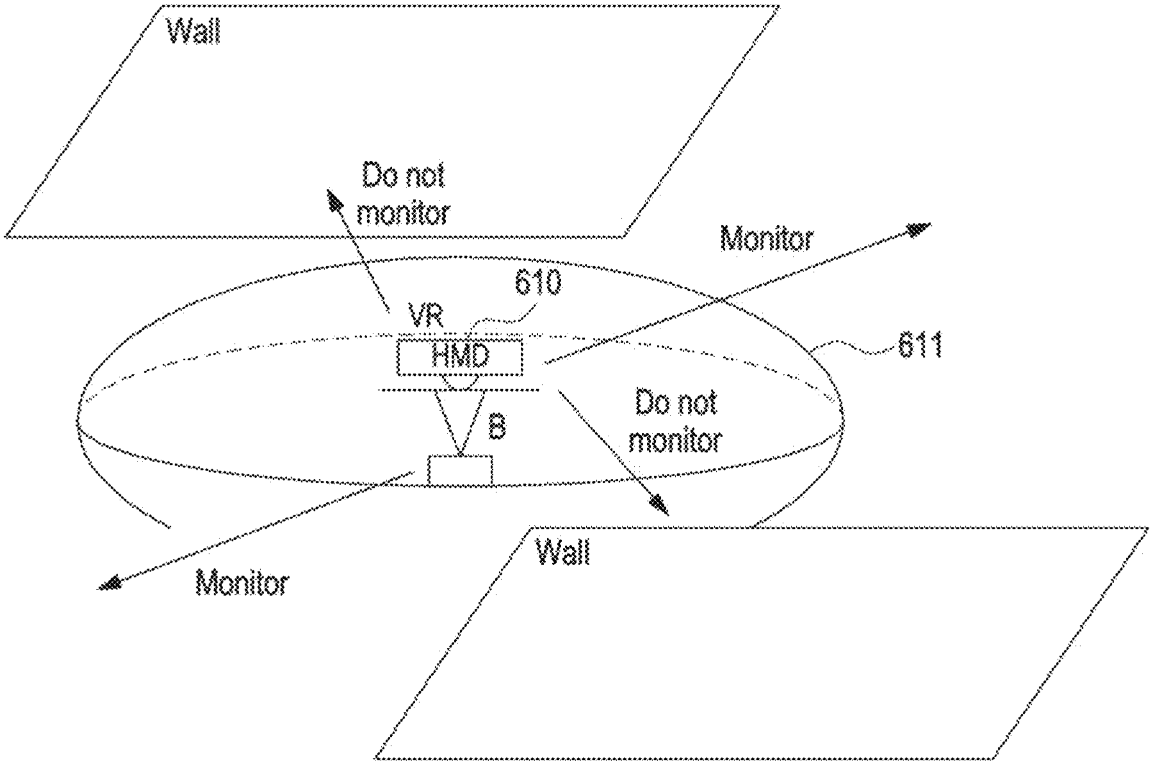
FIG. 9 is a diagram illustrating an operation of transmitting information related to a protection area by an electronic device according to an embodiment.

FIG. 9 is a diagram illustrating an operation of transmitting information related to a protection area by an electronic device according to an embodiment.

Referring to FIG. 9, according to an embodiment, the first electronic device 610 may monitor only in a predetermined direction when monitoring whether another electronic device (e.g., the second electronic device 620) is located in the broadcasting area 612 as described in FIG. 8. For example, the protection area 611 set for the first electronic device 610 may be set in the form of a cylinder or a sphere, and, accordingly, the first electronic device 610 may monitor whether an external electronic device is present in all directions from the first electronic device 610. However, in the case in which a wall or an obstacle is located in a predetermined direction from the first electronic device 610, the first electronic device 610 may determine that an external electronic device is incapable of accessing and may perform control so as not to perform monitoring in the corresponding predetermined direction.

Figure 10:
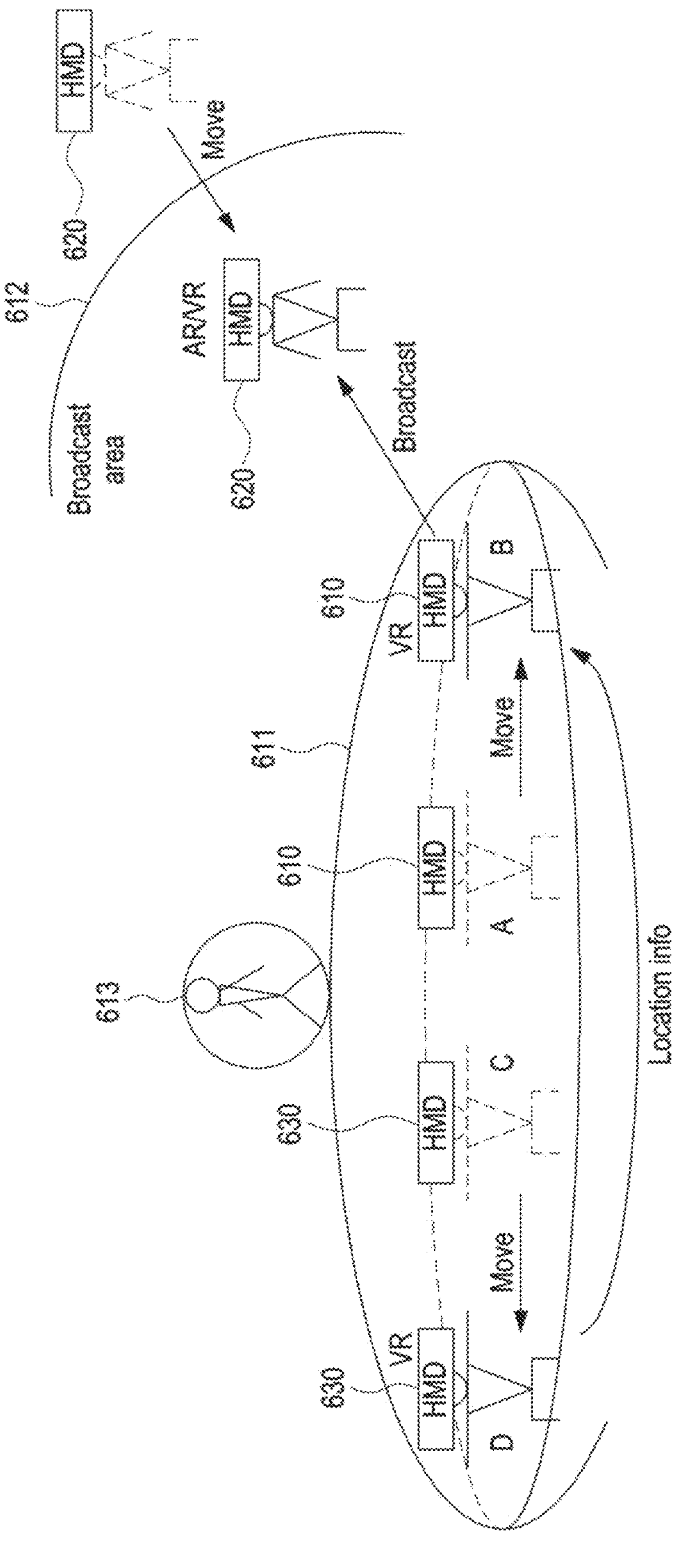
FIG. 10 is a diagram illustrating an operation of transmitting information related to a protection area by an electronic device according to an embodiment.
Figure 11:
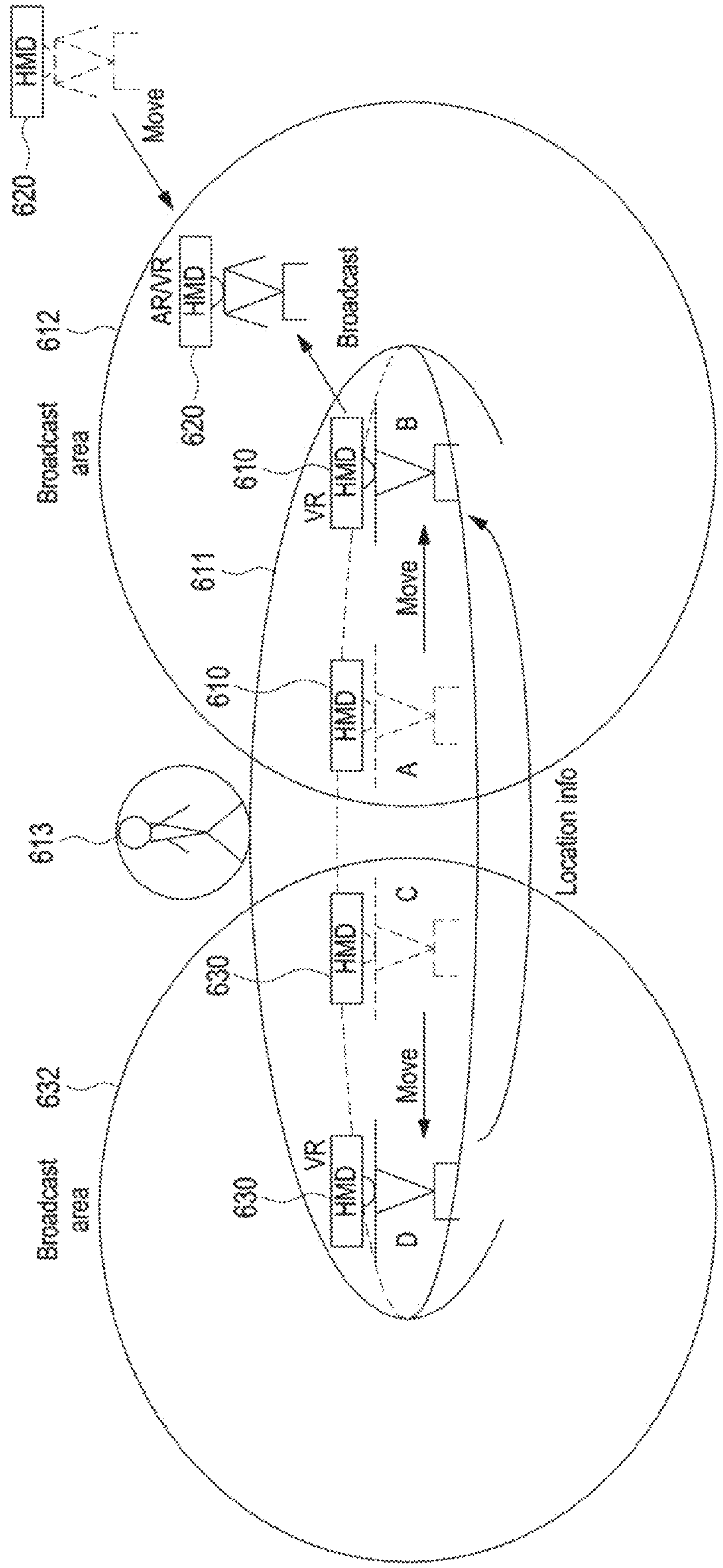
FIG. 11 is a diagram illustrating an operation of transmitting information related to a protection area by an electronic device according to an embodiment.

FIGS. 10 and 11 are diagrams illustrating an operation of transmitting information related to a protection area by an electronic device according to an embodiment.

Referring to FIG. 10 and FIG. 11, the first electronic device 610 and a third electronic device 630 may share and execute the same application (e.g., a VR-related application). For example, as the first electronic device 610 and the third electronic device 630 share and execute the same application, they may set the same protection area 611. According to an embodiment, the protection area 611 set to correspond to the application executed in the first electronic device 610 and the third electronic device 630 may be set to be in the same size as a protection area set to correspond to an application that is independently executed only in the first electronic device 610, or may be set to be relatively larger than that.

According to an embodiment, the first electronic device 610 may move from location A to location B, and the third electronic device 630 may move from location C to location D. The second electronic device 620 that has been located outside the broadcasting area 612 may move and enter the broadcasting area 612 of the first electronic device 610. Accordingly, as described above, the second electronic device 620 may receive information related to the protection area 611 broadcasted from the first electronic device 610. In addition, according to an embodiment, the first electronic device 610 may broadcast location information of the first electronic device 610 (e.g., relative location information of a location that is changed from an initial location due to a movement in the protection area 611). The second electronic device 620 may identify information broadcasted from the first electronic device 610, and may identify the relative location information of the first electronic device 610 in the protection area 611, in addition to the information associated with the protection area 611.

According to an embodiment, the third electronic device 630 may not broadcast information to the second electronic device 620 because the third electronic device 630 moves from location C to location D. For example, although the third electronic device 630 broadcasts location information of the third electronic device 630 (e.g., relative location information of a location changed from an initial location due to a movement in the protection area 611), the second electronic device 620 may not receive the information broadcasted from the third electronic device 630 because the second electronic device 620 is not located in a broadcasting area 632 of the third electronic device 630. According to various embodiments, the third electronic device 630 may transmit information related to the third electronic device 630 (e.g., relative location information of a location changed from an initial location due to a movement in the protection area 611) to the first electronic device 610. The first electronic device 610 broadcasts the location information of the third electronic device 630, thereby providing the location information of the third electronic device 630 to the second electronic device 620. For example, the second electronic device 620 may identify the information broadcasted from the first electronic device 610, and may identify the protection area 611 based on the information that the first electronic device 610 and the third electronic device 630 share, the location information of the first electronic device 610, and the location information of the third electronic device 630.

Figure 12A:
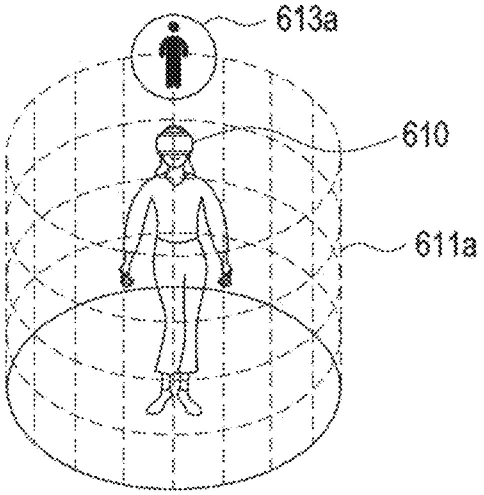
FIG. 12A is a diagram illustrating information related to a protection area displayed in an electronic device according to an embodiment.
Figure 12B:
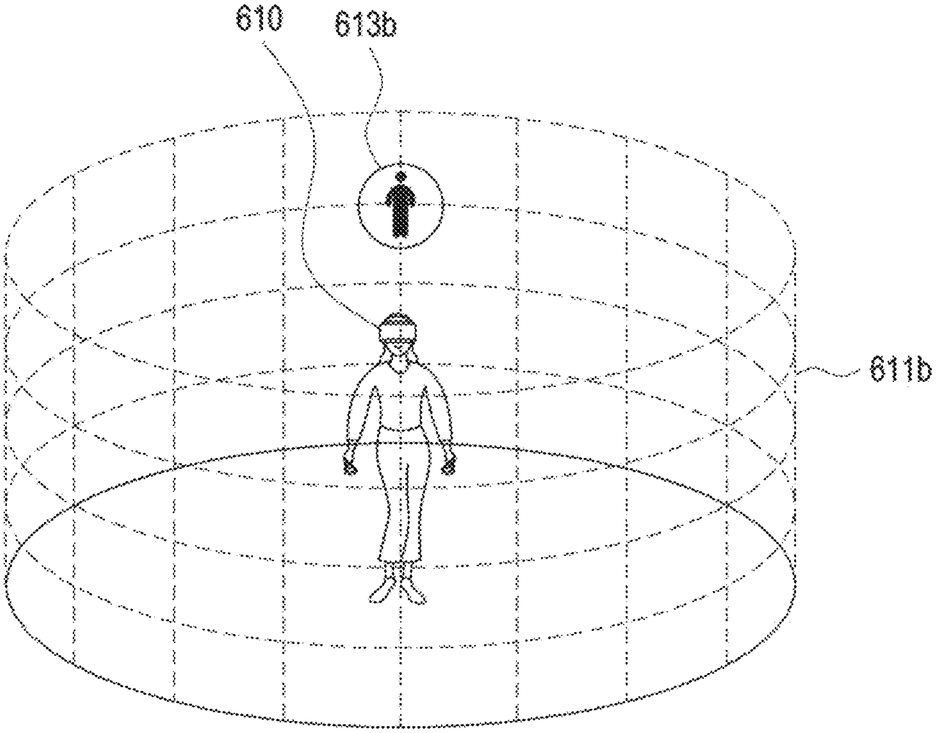
FIG. 12B is a diagram illustrating information related to a protection area displayed in an electronic device according to an embodiment.
Figure 12C:
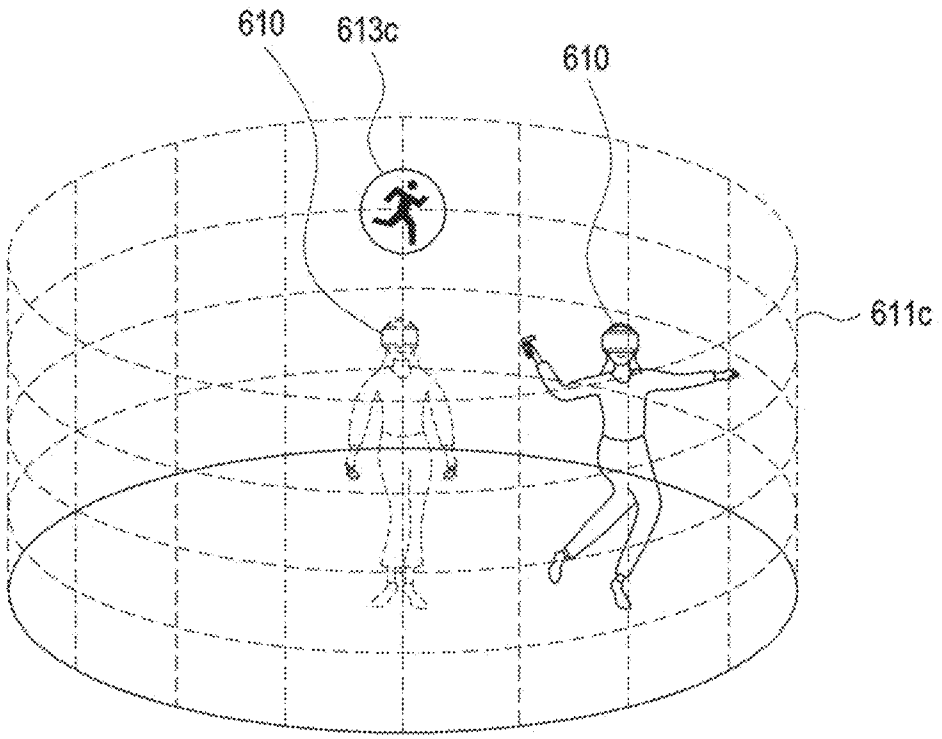
FIG. 12C is a diagram illustrating information related to a protection area displayed in an electronic device according to an embodiment.

FIG. 12A is a diagram illustrating information related to a protection area displayed in an electronic device according to an embodiment. FIG. 12B is a diagram illustrating information related to a protection area displayed in an electronic device according to an embodiment. FIG. 12C is a diagram illustrating information related to a protection area displayed in an electronic device according to an embodiment.

Referring to FIGS. 12A, 12B, and 12C, the radius of the protection area 611 may be set to be different depending on the characteristic of an application executed in the first electronic device 610. For example, referring to FIG. 12A, in the case in which an application executed in the first electronic device 610 is an application having a static characteristic (e.g., an application that is used while a user is in a sitting position or standing position, motionlessly), the size of a protection area 611*a* may be set to be relatively narrow. Conversely, referring to FIG. 12B, in the case in which an application executed in the first electronic device 610 is an application having a dynamic characteristic (e.g., an application that requires a large amount of activity), the size of a protection area 611*b* may be set to be relatively broad. In this instance, based on the amount of activity of the user, an icon may be displayed. For example, referring to FIG. 12A and FIG. 12B, although the sizes of the protection areas are different from each other, the same icon 613*a* and 613*b* may be displayed if the amount of activity of the user is the same.

According to an embodiment, although a protection area (e.g., the protection area 611*c*) is in the same size because the same application is executed, a different icon 613*c* may be displayed based on the amount of activity of the user. For example, referring to FIG. 12*c*, although the sizes of the protection areas 611*b* and 611*c* are the same because the application same as FIG. 12B is used, the different icon 613*c* may be displayed as the amount of activity of the user is increased.

According to an embodiment, for visibility in all directions, one icon 613*a*, 613*b*, and 613*c* may be displayed in the top end of a protection area, or a plurality of icons or images may be displayed in the form of watermarks.

Figure 13:
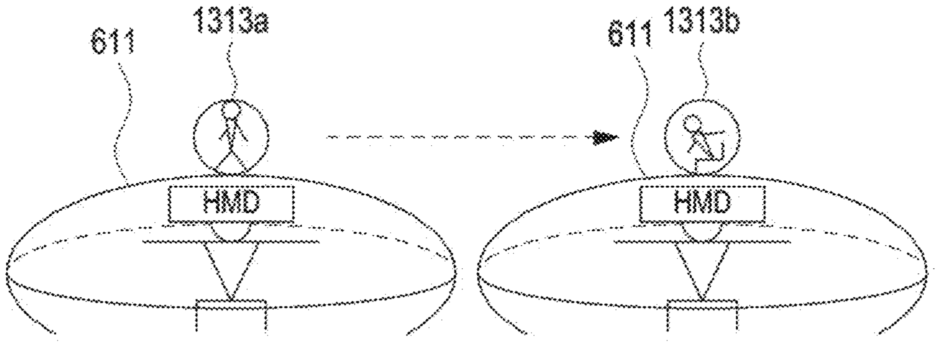
FIG. 13 is a diagram illustrating an operation related to changing information displayed in an electronic device according to an embodiment.

FIG. 13 is a diagram illustrating an operation related to changing information displayed in an electronic device according to an embodiment.

Referring to FIG. 13, according to an embodiment, the amount of activity of a user may be determined based on information (e.g., a heart rate, a blood pressure, an arm movement, or the like) obtained via another wearable electronic device (e.g., a smartwatch) that the user wears. For example, in the case in which an application that is executed in the electronic device 610 is an application for a light stroll, a static state icon 1313*a* as illustrated in FIG. 13 may be displayed. In the case in which the heart rate of a user is identified as a value only shown when the user does a strenuous exercise, the icon may be changed and a running state icon 1313*b* may be displayed. For example, the icon may be changed based on a change in the heart rate, a change in the blood pressure, or a degree of the arm movement.

Figure 14:
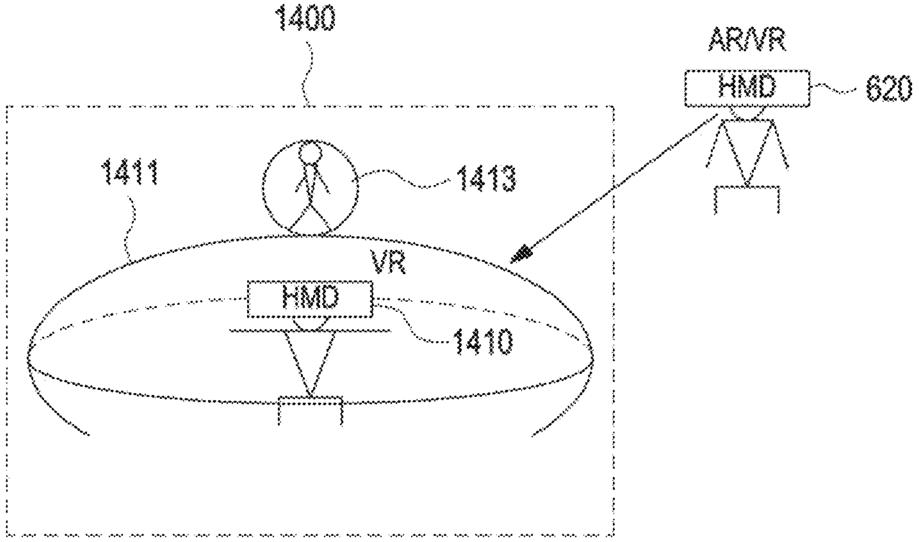
FIG. 14 is a diagram illustrating information related to a protection area displayed in an electronic device according to an embodiment.

FIG. 14 is a diagram illustrating information related to a protection area displayed in an electronic device according to an embodiment.

Referring to FIG. 14, as described above, the first electronic device 610 may broadcast information related to a protection area and information related to an activity of a user. The second electronic device 620 located in a broadcasting area of first electronic device 610 may receive information broadcasted from the first electronic device 610. According to an embodiment, based on the information received from the first electronic device 610, the second electronic device may display, on a screen 1400 of the second electronic device 620, a protection area 1411 set for the first electronic device 610, an image 1410 associated with the first electronic device 610 in the protection area 1411, and an image 1413 associated with the degree of the activity of a user who wears the first electronic device 610.

According to an embodiment, the HMD device 200 may include the communication module 310, the processor 350, and the memory 340 storing instructions.

The instructions may be configured to cause, when executed by the processor, the electronic device to execute a first application related to a virtual reality. The instructions may identify a protection area that is set based on a location of the HMD device, and corresponds to the first application. The instructions may be configured to transmit, via the communication module, information related to a changed protection area based on a change of the protection area.

According to an embodiment, the instructions may be configured to cause, when executed by the processor, the HMD device to identify a protection area of an external electronic device upon identifying that the size of the protection area is increased as the protection area is changed. The instructions may be configured to transmit a warning message to the external electronic device via the communication module upon identifying that the changed protection area and the protection area of the external electronic device overlap.

According to an embodiment, the instructions may be configured to cause, when executed by the processor, the HMD device to transmit information related to the changed protection area upon identifying that the size of the protection area is increased as the protection area is changed.

In accordance with an aspect of the disclosure, a HMD device includes: a communication interface; a processor; and memory storing instructions, which, when executed by the processor, cause the HMD device to: identify a protection area of the HMD device corresponding to a first virtual reality application based on a position of the HMD device and a status of a user of the first virtual reality application, update the protection area based on a change in the status of the user; and transmit information related to the change in the protection area through the communication interface.

The instructions, when executed by the processor, may cause the HMD device to obtain user status information from an external wearable device.

The user status information may indicate any one or any combination of a heart rate, a blood pressure and an arm movement.

The instructions, when executed by the processor, may cause the HMD device to identify the change in the status of the user based on a change indicated by the user status information.

The instructions, when executed by the processor, may cause the HMD device to increase a size of protection area based on the heart rate changing from a first rate to a second rate that is higher than the first rate.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A head mounted display (HMD) device comprising:

communication circuitry;

at least one processor including processing circuitry; and memory storing instructions, which, when executed by the at least one processor individually or collectively, cause the HMD device to:

execute a first application related to virtual reality, identify a first protection area of the HMD device based on a first characteristic of the first application indicating that the first application is a static application, the first protection area of the HMD device being set based on a location of the HMD device, transmit information indicating the first protection area via the communication circuitry, change a protection area of the HMD device from the first protection area to a second protection area based on a second application being executed after execution of the first application, wherein the second protection area is identified based on a second characteristic of the second application indicating that the second application is a dynamic application, and wherein the second protection area is maintained during execution of the second application while an amount of activity of a user who wears the HMD device varies, and based on the protection area changing to the second protection area, transmit information indicating the second protection area via the communication circuitry.

2. The HMD device of claim 1, wherein the instructions, when executed by the at least one processor individually or collectively, cause the HMD device to:

based on the protection area changing to the second protection area, identify a protection area of an external electronic device, and based on identifying that the second protection area of the HMD device overlaps with the protection area of the external electronic device, transmit, to the external electronic device, an alarm message via the communication circuitry.

3. The HMD device of claim 1, wherein the information indicating the second protection area indicates a center location of the second protection area and a radius of the second protection area.

4. The HMD device of claim 1, wherein the instructions, when executed by the at least one processor individually or collectively, cause the HMD device to set or update the first protection area of the HMD device based on a user input.

5. The HMD device of claim 1, wherein the virtual reality comprises any one or any combination of an extended reality (XR), an augmented reality (AR), or a mixed reality (MR).

6. The HMD device of claim 1, wherein the instructions, when executed by the at least one processor individually or collectively, cause the HMD device to:

identify information related to an activity of the user wearing the HMD device, and based on the information related to the activity of the user, transmit the information related to the activity via the communication circuitry.

7. The HMD device of claim 1, wherein the instructions, when executed by the at least one processor individually or collectively, cause the HMD device to transmit information related to an activity of the user wearing the HMD device via the communication circuitry.

8. The HMD device of claim 1, wherein the second protection area is larger than the first protection area.

9. The HMD device of claim 1, wherein the first application is executed while the user is sitting and the second application is executed while the user is moving.

10. The HMD device of claim 9, wherein the second protection area is larger than the first protection area.

11. The HMD device of claim 1, wherein the instructions, when executed by the at least one processor, cause the HMD device to change an icon representing an activity of the user in response to a change in the amount of activity while the second protection area is maintained.

12. The HMD device of claim 11, wherein the instructions, when executed by the at least one processor, cause the HMD device to transmit information indicating the changed icon representing the activity of the user in response to the change in the amount of activity while the second protection area is maintained.

13. A method of operating a head mounted display (HMD) device, the method comprising:

executing a first application related to virtual reality;

identifying a first protection area based on a first characteristic of the first application indicating that the first application is a static application, the first protection area of the HMD device being set based on a location of the HMD device;

transmitting information indicating the first protection area via communication circuitry;

changing a protection area of the HMD device from the first protection area to a second protection area based on a second application being executed after execution of the first application, wherein the second protection area is identified based on a second characteristic of the second application indicating that the second application is a dynamic application;

based on the protection area changing to the second protection area, transmitting information indicating the second protection area via the communication circuitry; and maintaining the second protection area during execution of the second application while an amount of activity of a user who wears the HMD device varies.

14. The method of claim 13, wherein the information indicating the second protection area indicates a center location of the second protection area and a radius of the second protection area.

15. The method of claim 13, further comprising setting or changing the first protection area based on a user input.

16. The method of claim 13, wherein the information indicating the second protection area is broadcasted via the communication circuitry.

17. The method of claim 13, further comprising:

identifying information related to an activity of the user who wears the HMD device; and based on the information related to the activity of the user, transmitting the information related to the activity area-via the communication circuitry.

18. A non-transitory storage medium storing computer-readable instructions which, when executed by at least one processor of a head mounted display (HMD) device, cause the HMD device to perform operations, the operations comprising:

executing a first application related to virtual reality;

identifying a first protection area based on a first characteristic of the first application indicating that the first application is a static application, the first protection area of the HMD device being set based on a location of the HMD device;

transmitting information indicating the first protection area via communication circuitry;

changing a protection area of the HMD device from the first protection area to a second protection area based on a second application being executed after execution of the first application, wherein the second protection area is identified based on a second characteristic of the second application indicating that the second application is a dynamic application;

based on the protection area changing to the second protection area, transmitting information indicating the second protection area via the communication circuitry; and maintaining the second protection area during execution of the second application while an amount of activity of a user who wears the HMD device varies.

* * * * *